(12) United States Patent
Kagle

(10) Patent No.: US 7,321,719 B2
(45) Date of Patent: *Jan. 22, 2008

(54) METHOD AND APPARATUS FOR SYNCHRONIZING AUDIO RECORDINGS WITH DIGITAL STILL FRAME IMAGES

(75) Inventor: Jonathan C. Kagle, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

This patent is subject to a terminal disclaimer.

(21) Appl. No.: 10/887,768

(22) Filed: Jul. 9, 2004

(65) Prior Publication Data

US 2004/0240855 A1     Dec. 2, 2004

Related U.S. Application Data

(63) Continuation of application No. 09/299,508, filed on Apr. 26, 1999, now Pat. No. 6,778,760.

(51) Int. Cl.
*H04N 5/91* (2006.01)
(52) U.S. Cl. ........................................ 386/96; 386/120
(58) Field of Classification Search ................ 386/46, 386/96, 104, 105, 95, 106
See application file for complete search history.

(56) References Cited

U.S. PATENT DOCUMENTS

| 4,491,879 A | 1/1985 | Fine ........................... 360/14.1 |
| 4,951,155 A | 8/1990 | Andrews ..................... 386/106 |
| 5,555,098 A | 9/1996 | Parulski ...................... 386/104 |
| 5,731,852 A | 3/1998 | Lee ............................. 348/719 |
| 5,782,692 A | 7/1998 | Stelovsky ...................... 463/1 |
| 5,812,736 A | 9/1998 | Anderson ..................... 386/96 |
| 6,084,582 A | 7/2000 | Qureshi et al. .......... 707/500.1 |
| 6,778,760 B1* | 8/2004 | Kagle ........................... 386/96 |
| 2002/0036694 A1 | 3/2002 | Merrill ....................... 348/220 |

* cited by examiner

*Primary Examiner*—Huy Nguyen
(74) *Attorney, Agent, or Firm*—John D. Veldhuis-Kroeze; Westman, Champlin & Kelly, P.A.

(57) ABSTRACT

A digital audio recording device is provided with an audio recorder adapted to receive sound waves and to provide in response a digital audio data stream. The recording device also includes an image recorder which provides digital representations of multiple still frame images. A synchronizer receives the digital audio data stream and the digital representations of the still frame images and provides as an output the digital audio data stream synchronized with the still frame images. An image selection input provides interactive synchronization of particular still frame images with particular portions of the audio data stream. In addition, methods of synchronizing the audio data stream and the still frame images are provided.

4 Claims, 9 Drawing Sheets

METHOD AND APPARATUS FOR SYNCHRONIZING AUDIO RECORDINGS WITH DIGITAL STILL FRAME IMAGES

The present application is a continuation of and claims priority of U.S. patent application Ser. No. 09/299,508, filed Apr. 26, 1999 now U.S. Pat. No. 6,778,760, the content of which is hereby incorporated by reference in its entirety.

BACKGROUND OF THE INVENTION

Business, educational and other types of presentations typically utilize a combination of recorded audio and either still frame images or video. Recording and playback of video involves significantly more data than is typically required in recording and playback of audio. Consequently, recording and playback of a video presentations requires significantly higher bandwidth, processing power and memory storage space.

In the prior art, as an alternative to using video, audio presentations have been combined with still frame images. Since still frame images involve significantly less data than video, presentations utilizing the combination of audio and still frame images require significantly less processing power and storage capacity than video presentations. However, synchronization of still frame images with particular portions of the audio track in a presentation is problematic. Typically, in order to switch at the correct time from the display of one still frame image to the display of the next still frame image, it is required that a person either manually change a slide or transparency, or that the person actuate a user interface of the computer or presentation device in order to change the still frame image.

Another associated problem relates to recording primarily-vocal presentations where there are illustrations, slides or other visual aids. Audio recording of such a presentation does not provide the benefit of recording the visual components of the presentation. As discussed above, video recording of the presentation has the disadvantage of requiring significantly more bandwidth, processing power and storage capacity than simply audio recording the presentation. Previous solutions to this problem have included recording the audio portion of the presentation with a cassette recorder, while taking still frame images or pictures of the visual portions of the presentation with a camera. Then, it must be determined at a later time which pictures correspond to which portions of the audio recording.

Some digital cameras include audio recording. capabilities. However, these digital cameras are limited in capability to adding a short audio annotation to an individual picture. This one-to-one relationship between a short audio annotation and a single still frame image is not an efficient or convenient format for creating or recording presentations or lectures.

SUMMARY OF THE INVENTION

A digital audio recording device is an audio recorder that receives-sound waves and provides in response a digital data stream. The digital audio recording device of the invention also includes an image recorder which provides digital representations of multiple still frame images. A synchronizer receives the digital audio data stream and the digital representations of the still frame images and provides as an output the digital audio data stream synchronized with the still frame images. An image selection input provides interactive synchronization of particular still frame images with particular portions of the audio data stream. In addition, methods of synchronizing the audio data stream and the still frame images are provided.

DETAILED DESCRIPTION OF AN ILLUSTRATIVE EMBODIMENTS

Figure 1:
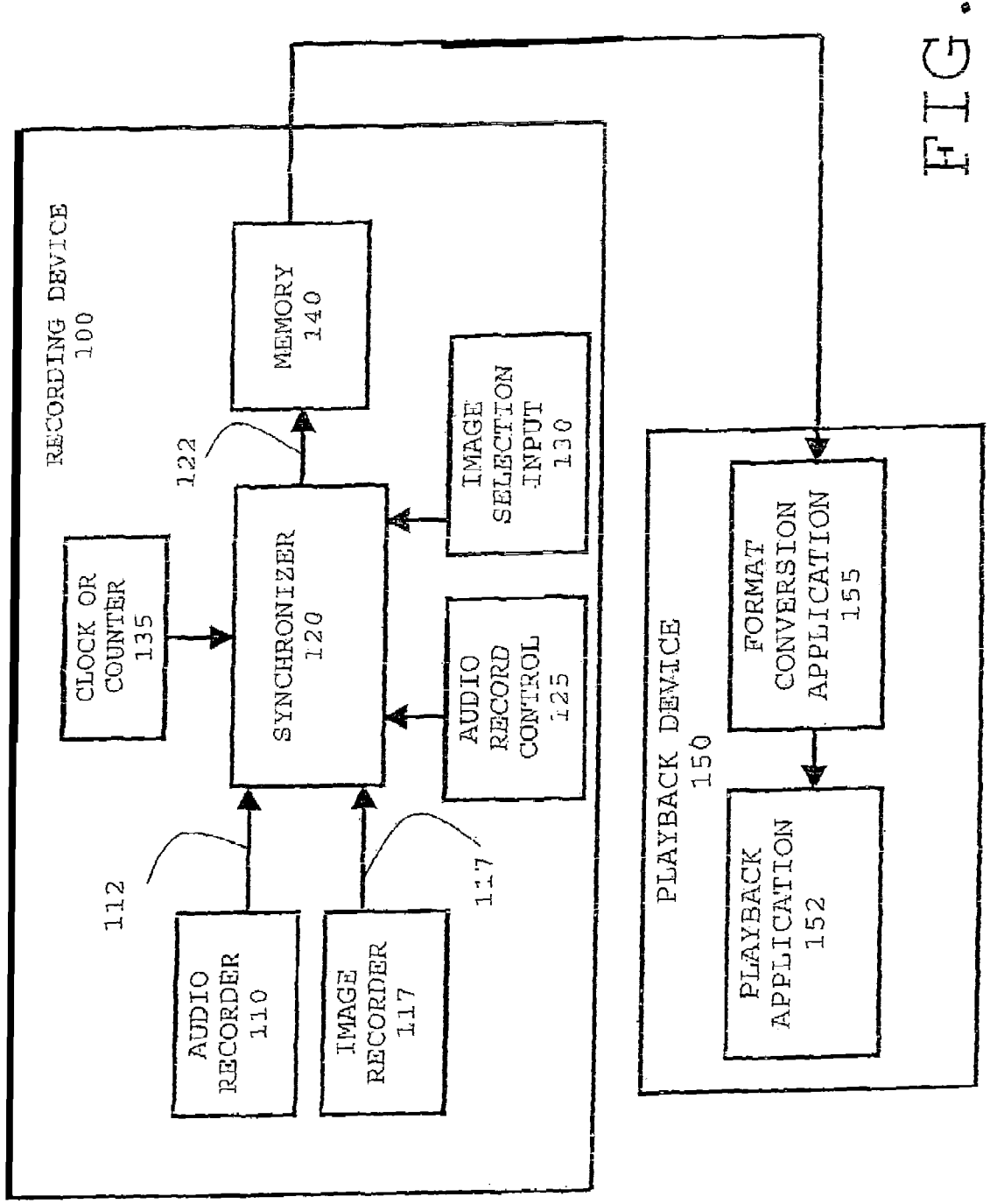
FIG. 1 is a block diagram illustrating one embodiment of a digital recording device with audio and still frame image synchronization in accordance with the present invention.

FIG. 1 is a block diagram of digital recording device 100 in accordance with embodiments of the present invention. Digital recording device 100 can be considered a digital audio recording device with digital still frame image recording and synchronization features. In the alternative, recording device 100 can be considered a digital camera with continuous digital audio recording and synchronization features. Digital recording device 100 is discussed primarily with reference to preparation or recording of presentations. However, those skilled in the art will recognize that recording device 100 can be used for other purposes, for example recording group or family events, note taking during lectures, documenting insurance or other types of investigations which typically involve still frame photography, and others. Also illustrated in FIG. 1 is playback device 150 which is used to playback the synchronized audio and still frame image recording (referred to as "the presentation") in accordance with the invention.

Digital recording device 100 includes audio recorder 110, image recorder 115, synchronizer 120, audio record control input 125, image selection input 130, clock or counter time reference 135 and memory 140. Audio recorder 110 is a device of the type known in the art which is adapted to receive soundwaves and to provide in response at output 112 a digital audio data stream indicative of the received soundwaves. The digital audio data stream provided by audio recorder 110 can be a substantially continuous data stream and can be provided in any suitable data format. For example, the digital audio data stream provided by audio recorder 110 can be in a format known as WAVE (. WAV) in the computer and software industries.

Image recorder 115 is a digital camera or image sensor of the type known in the art which is adapted to provide at output 117 digital representations of still frame images to be recorded. The digital representations of the still frame images provided at output 117 are typically provided one at a time to reflect the image currently in view of an image recorder lens (not shown). The digital representations can be in any digital image format. For example, the digital representations of the still frame images provided at output 117 of image recorder 115 can be in the Joint Photographic Experts Group (JPEG) format, the Graphics Interchange Format (GIF), the Tag Image File Format (TIFF), or in other formats.

Synchronizer 120 is a microprocessor, a digital signal processor or other circuitry or devices adapted to receive the digital audio data stream from audio recorder 110 and the digital representations of the still frame images from image recorder 115 as inputs, and adapted to provide at output 122 the audio data stream synchronized with the still frame images (the presentation). In some embodiments, synchronizer 120 also receives as inputs audio record control signals from audio record control input 125, and image selection input signals from image selection input 130. Audio record control input 125 is actuated by the operator of device 100 when recording of audio signals is to be started or stopped. In some embodiments, audio record control input 125 also allows rewinding and fast forwarding.

When audio signals are to be recorded, synchronizer 120 provides the digital audio data stream received from audio recorder 110 to memory device 140 for storage. While audio record control input 125 is shown as an input to synchronizer 120, in alternate embodiments audio record control input 125 can be provided to audio recorder 110 to initiate conversion of the received soundwaves into the digital audio data stream. In still other embodiments, audio recorder 110 provides a continuous digital audio data stream at output 112, and audio record control 125 is used to selectively provide the digital audio data stream to synchronizer 120 through the control of a switch (not shown).

Image selection input 130 can be a shutter button or other input device adapted to be actuated by the user of recording device 100. Upon actuation of image selection input 130, synchronizer 120 synchronizes a particular still frame image received from image recorder 115 with a particular portion of the audio data stream. Actuation of image selection input 130 will cause synchronizer 120 to synchronize the current still frame image with the portion of the audio data stream currently provided by audio recorder 110. Synchronizer 120 can also implement a timing offset to compensate for a time difference between actuation of image selection input 130 and the actual time when the still frame image is ready or available for insertion into the audio stream. For example, synchronizer 120 can buffer the audio stream by the determined delay so that when the digital representation of the still frame image becomes available, it is synchronized with the correct portion of the audio data stream. While image selection input 130 is shown as an input to synchronizer 120, in other embodiments image selection input 130 is an input to image recorder 115. In these embodiments, image recorder 115 only provides a digital representation of a still frame image upon actuation of image selection input 130. In still other embodiments, image recorder 115 continuously provides digital representations of still frame images at output 117, but the digital representations of the still frame images are only provided to synchronizer 120 through a switch (not shown) under the control of image selection input 130.

While audio recorder 110 and image recorder 115 are described above as providing digital representations of the sound waves or still frame images in particular formats, in other embodiments audio recorder 110 can provide at output 112 a digitized version of an analog signal produced from the received soundwaves without providing any further formatting. Similarly, the digital representations of still frame images provided by image recorder 115 need not be in a standardized or compressed format. In these embodiments, synchronizer 120 will typically provide the conversion of the audio data stream and the digital representations of the still frame images into standardized or compressed formats of types typically used in the computer and software industries. In still other embodiments, conversion of the audio and still frame image data occurs in a playback device 150. Existing formats which can be used to store the synchronized data include the Active Movie Streaming format (ASF) and the Audio-Video Interleave (AVI) format. Other new or existing formats can be used as well.

Clock or counter 135 provides a time reference which is used in the synchronization of still frame images to particular portions of the audio data stream in some embodiments of the present invention. Memory 140 is a hard disc drive, a flash card, a floppy disc or other type of memory device adapted to store the digital audio data stream and the digital representations of still frame images in a synchronized format. Various synchronization formats are discussed below with reference to FIGS. 4-8.

The synchronized audio data stream and still frame images (the presentation) can be provided to playback device 150 using any of a wide variety of data transfer techniques. For example, memory 140 can be a floppy disc which is transferable to playback device 150. In other embodiments, the presentation is transferred from recording device 100 to playback device 150 using a cable connected directly between the devices, using infrared transmission between the devices, or using a computer network such as a local area network (LAN) or the Internet. The presentation provided to playback device 150 can be in a format which is already usable by playback application 152. However, in other embodiments, the presentation provided to playback device 150 requires conversion to a different format by format conversion application 155 prior to the presentation being usable by playback application 152.

Figure 2:
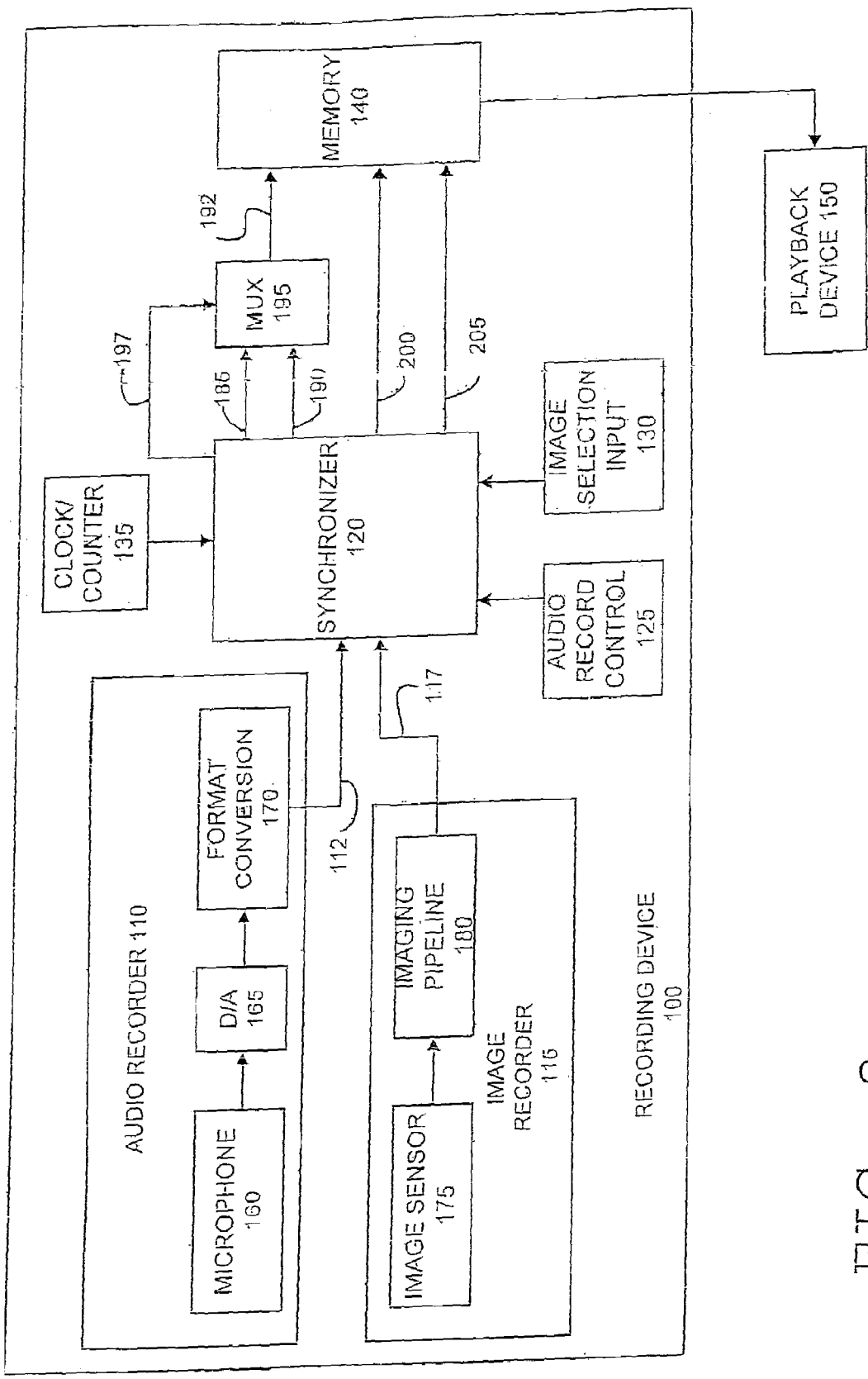
FIG. 2 is a block diagram of a more particular embodiment of the digital recording device illustrated in FIG. 1.

FIG. 2 is a block diagram illustrating one embodiment of recording device 100 in greater detail. As illustrated in FIG. 2, audio recorder 110 includes microphone 160, digital-to-analog (D/A) converter 165 and format converter 170. Microphone 160 is of the type known in the art which converts soundwaves into an analog electrical signal. Digital-to-analog converter 165 converts the analog signal from microphone 160 into a digital signal which represents the analog signal. Format converter 170 is optionally included to convert the digitized audio signal into a desired format. Conversion of the digitized signal into a desired format can include, for example, conversion of the digitized signal from a serial data format to a parallel data form, conversion of the digitized signal from a parallel data format to a serial data format, and conversion of the digitized signals into a standardized or compressed format.

In the embodiment of recording device 100 shown in FIG. 2, image recorder 115 includes image sensor 175 and imaging pipeline 180. Image sensor 175 is typically a charge coupled device (CCD) or other image sensor and associated circuitry which provide a digital representation of a still frame image. Imaging pipeline 180 includes any circuitry, firmware or application programs which condition the digital representations of the still frame images, and/or convert the digital representations into a desired format.

In one embodiment, synchronizer 120 provides the digital audio data stream at output 185 and the still frame images at output 190. In response to control signals 197 provided by synchronizer 120, multiplexer 195 is controlled to combine the digital audio data stream with the digital representations of the still frame images to produce a combined data stream 192 containing both the digital audio data stream and the digital representations of the still frame images to be recorded. The combined data from the audio data stream and the still frame images is then stored in a single file in memory 140.

In other embodiments, synchronizer 120 provides the digital audio data stream at output 200 and the digital representations of still frame images at output 205, without combining the audio and still frame images into a common data stream. The data from the audio data stream and the data from the still frame images are then stored in separate files in memory 140. In these embodiments, either the audio data stream provided at output 200 is altered to include markers which synchronize a particular still frame image to a particular portion of the audio data stream, or the digital representations of the still frame images contain time stamps which synchronize the particular still frame images to the particular portions of the audio data stream. Generally, it is not necessary for synchronizer 120 to provide both outputs 185 and 190 and outputs 200 and 205. Which outputs are provided by synchronizer 120 is dependent upon the particular method of synchronizing the audio and still frame images utilized by synchronizer 120. The various synchronization methods are discussed below with reference to FIGS. 4-8.

Figure 3:
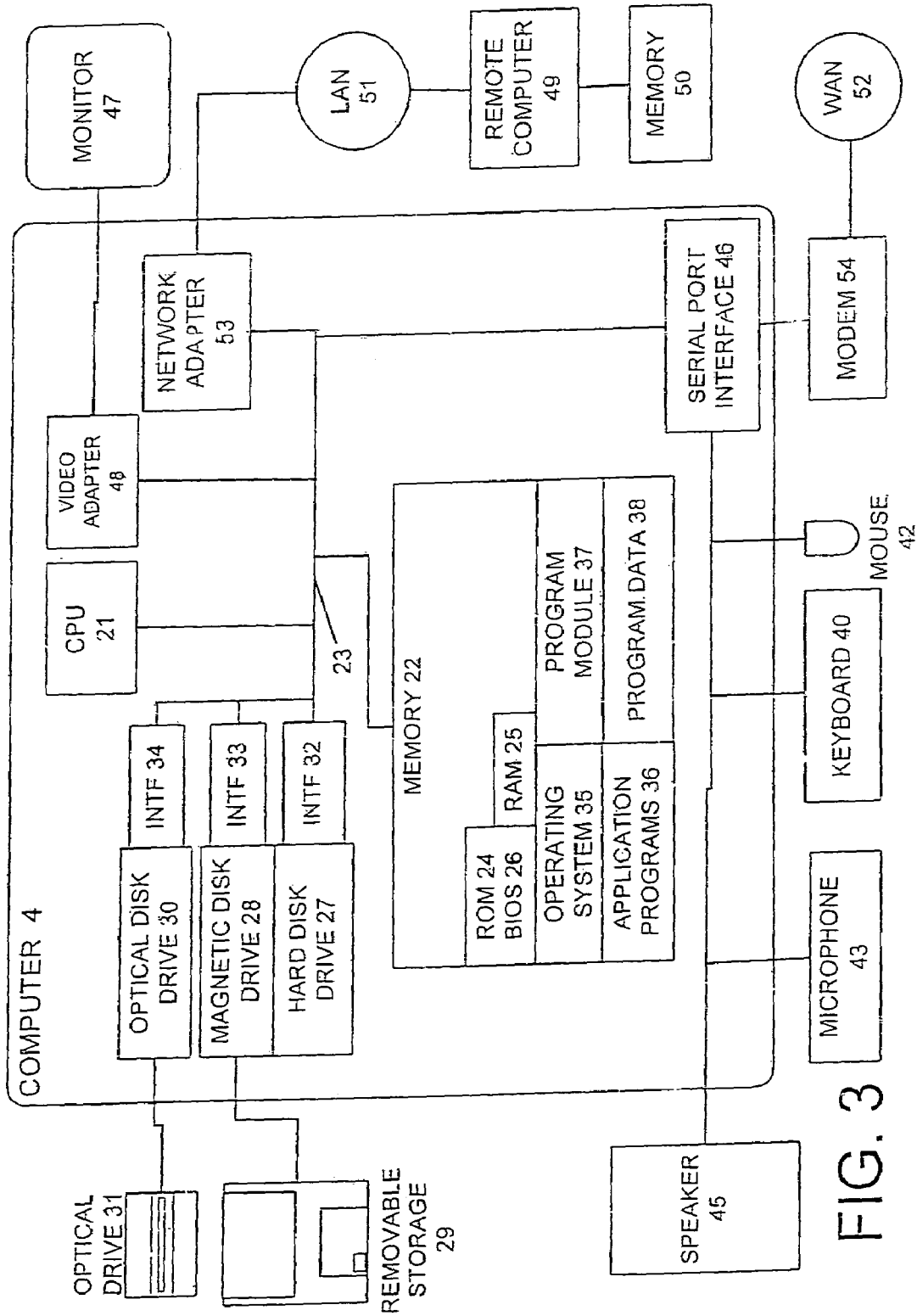
FIG. 3 is a block diagram of one embodiment of a conventional desktop computer which is programmed for use as a playback device for the synchronized audio and still frame image presentation recorded using the devices illustrated in FIGS. 1 and 2.

FIG. 3 and the related discussion are intended to provide a brief, general description of a suitable desktop computer 4. Computer 4 can be programmed to implement methods of the present invention to provide playback device 150 shown in FIGS. 1 and 2. Although not required, the invention will be described at least in part in the general context of computer-executable instructions, such as program modules, being executed by personal computer 4. Generally, program modules include routine programs, objects, components, data structures, etc. that perform particular tasks or implement particular abstract data types. Moreover, those skilled in the art will appreciate that desktop computer 4 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. While playback device 150 is described as being a suitably programmed desktop computer, those skilled in the art will recognize that playback device 150 can be a portable computer or other type of computing device adapted to execute an application program to playback the presentation. These other computing devices need not include all of the components of computer 4.

With reference to FIG. 3, an exemplary system for implementing desktop computer 4 includes a general purpose computing device in the form of a conventional personal computer 4, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the desktop computer 4.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the desktop computer 4 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, game port or a universal serial bus (USB). A display device 47 is connected to the system bus 23 via an interface, such as a video adapter 48. Display device 47 can be a cathode ray tube (CRT), a liquid crystal display (LCD) or other types of display devices. For playback of presentations, display devices such as LCD projector overlays can be used. In addition to the display device 47, desktop computers may typically include other peripheral output devices such as speaker 45 and printers.

The desktop computer 4 may operate in a networked environment using logic connections to one or more remote computers, such as a remote computer 49. The remote computer 49 may be another personal computer, a server, a router, a network PC, a peer device or other network node, and typically includes many or all of the elements described above relative to desktop computer 4, although only a memory storage device 50 has been illustrated in FIG. 3. The logic connections depicted in FIG. 3 include a local area network (LAN) 51 and a wide area network (WAN) 52. Such networking environments are commonplace in offices, enterprise-wide computer network intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to desktop computer 4, or portions thereof, may be stored in the remote memory storage devices. It will be appreciated that the network connections shown are exemplary and other means of establishing a communications link between the computers may be used.

Desktop computer 4 runs operating system 35 that is typically stored in non-volatile memory 24 and executes on the processor 21. One suitable operating system is a Windows® brand operating system sold by Microsoft® Corporation, such as Windows 95® or Windows NT®, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y.

Playback application 152 shown in FIG. 1 is stored in memory of computer 4 and is executed by processor 21 to playback the synchronized presentation. The playback application uses the presentation data files stored in memory to play the audio portion of the presentation through speaker 45 and to display the synchronized still frame images using display device 47. The recording devices, synchronized recording method and associated data storage formats, and the playback devices and methods of playback are all within the scope of the present invention.

Figure 4:
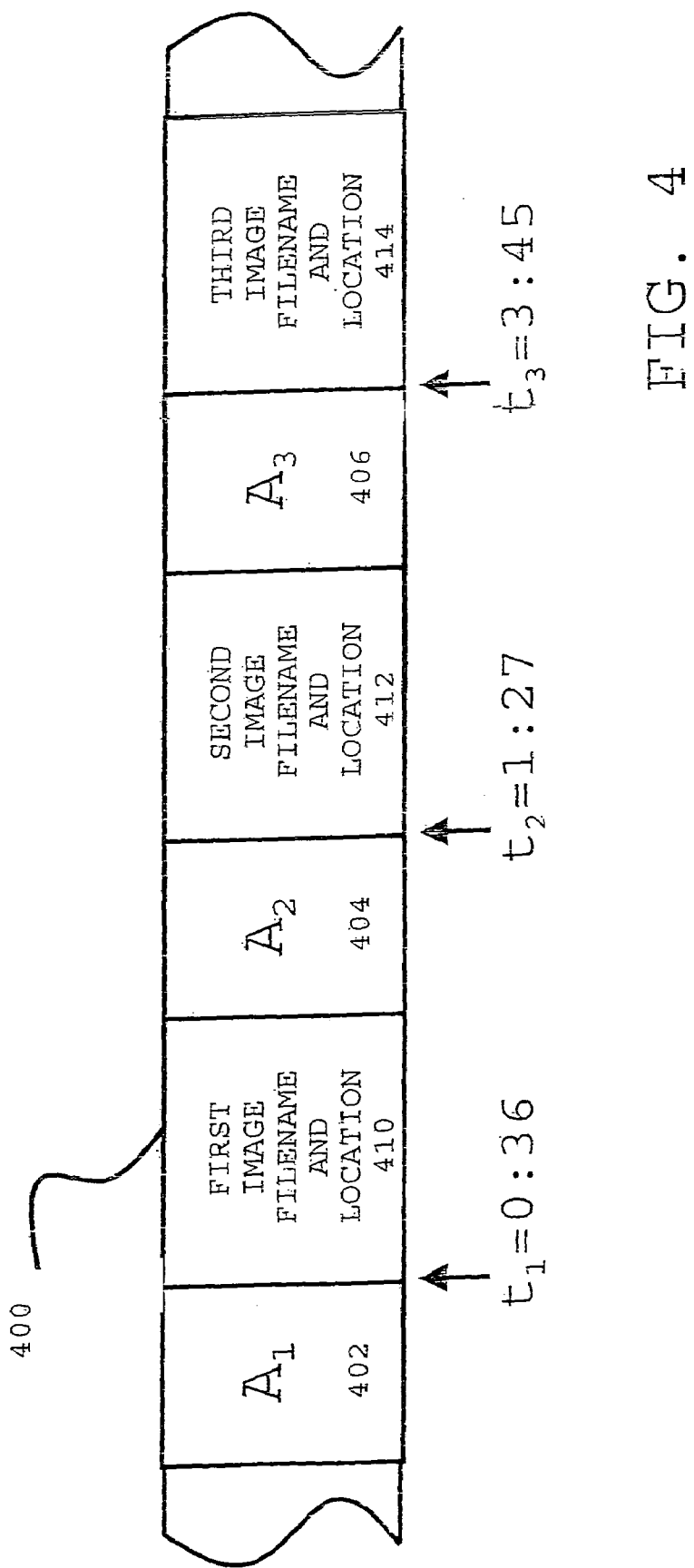
FIGS. 4-8 are diagrammatic illustrations of synchronized audio data stream and still frame image formats in accordance with the present invention.

FIG. 4 is a diagrammatic illustration of a first format which can be used to store the synchronized audio and still frame image presentation. FIG. 4 illustrates data stream 400 which can be provided by synchronizer 120, stored in memory 140 of recording device 100, and stored in memory and executed along with an application program in a playback device 150. Data stream 400 includes the audio data stream divided into segments (only segments 402, 404, and 406 are illustrated). The audio data contained within each segment is represented in FIG. 4 by the designation $A_N$, where N is the segment number. Included in data stream 400 between each of the audio segments is an image data segment (only segments 410, 412 and 414 are illustrated) representing the filename and storage location of a particular still frame image. The digital representations of each still frame image is stored in a file which is separate from data stream 400.

In an example used with reference to each of the formats discussed in connection with FIGS. 4-8, it is assumed that recording device 100 has synchronized a first still frame image with a time $t_1$ which is 36 seconds after the audio portion of the presentation began. A second still frame image is synchronized with a time $t_2$ which is 1 minute and 27 seconds after the audio portion of the presentation began. A third still frame image is synchronized with a time $t_3$ which is 3 minutes and 45 seconds after the audio portion of the presentation began. As illustrated in FIG. 4, first audio segment 402 ends, and first image segment 410 begins, at a position corresponding to playback time $t_1$. Second audio segment 404 ends, and second image segment 412 begins, at a position corresponding to playback time $t_2$. Third audio segment 406 ends, and third image segment 414 begins, at a position corresponding to playback time $t_3$.

While processing data stream 400, the playback application program 152 executed in playback device 150 plays the audio portion of the presentation based upon received audio segments of data stream 400. When application program 152 receives an image segment in data stream 400, the filename and storage location represented in the image segment are used to retrieve the particular synchronized still frame image from memory. The particular still frame image is then displayed using display device 47 until the next still frame image segment is received in data stream 400. In alternative embodiments, to aid in buffering the data stream and in retrieving the still frame image files by the synchronized times, each still frame image segment 410, 412 and 414 is divided into multiple sub-segments which are dispersed throughout the preceding audio segment. This provides more time for retrieval of the appropriate files, and also prevents discontinuities in the audio portion of the presentation. In yet other embodiments, particular still frame images are displayed until a marker (not shown in FIG. 4) indicates that they should no longer be displayed.

Figure 5:
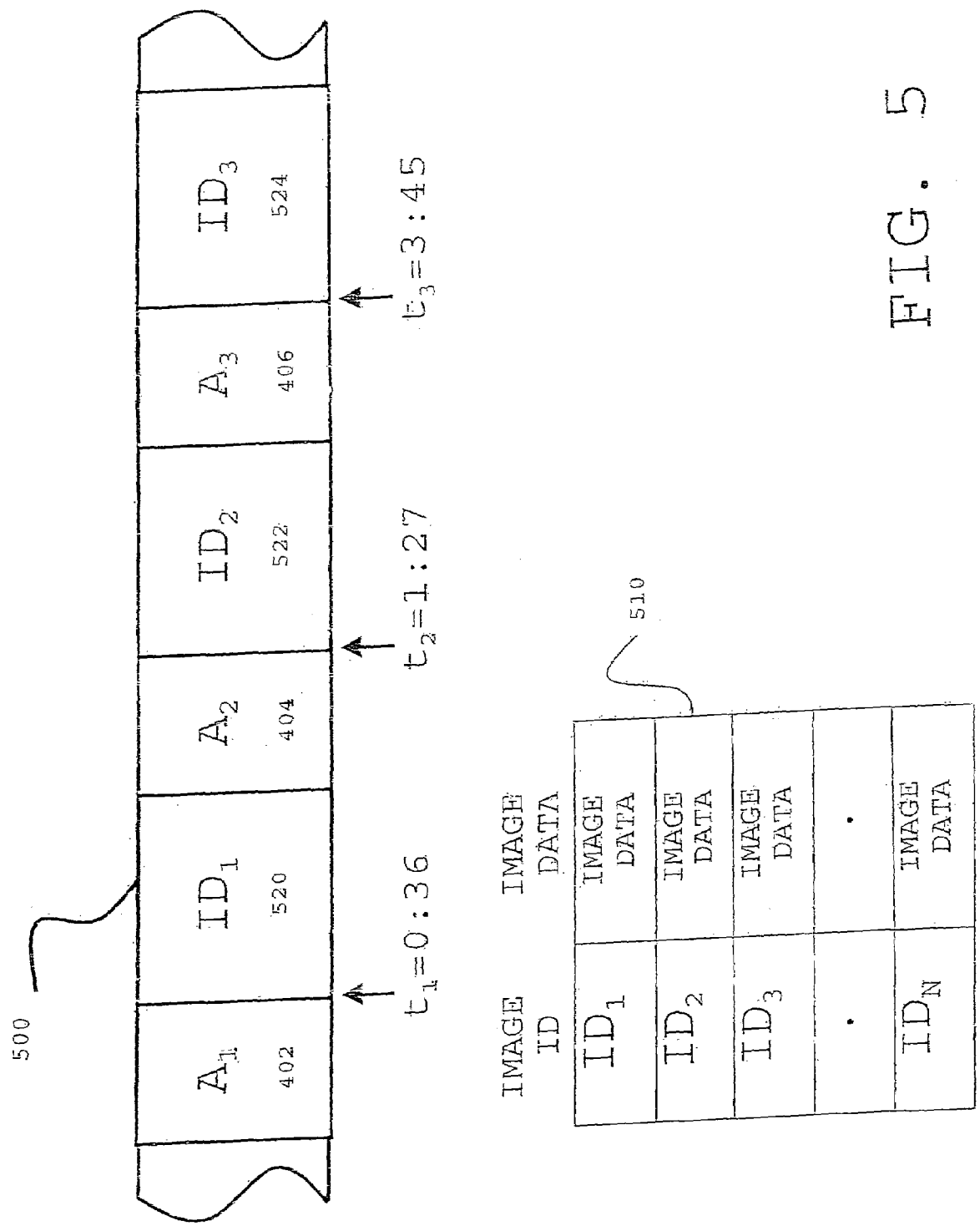

FIG. 5 is a diagrammatic illustration of a second format which can be used to store the synchronized audio and still frame image presentation. FIG. 5 illustrates data stream 500 and table 510 which can be provided by synchronizer 120, stored in memory 140 of recording device 100, and stored in memory and executed along with an application program in playback device 150. Like data stream 400, data stream 500 includes the audio data stream divided into segments (only segments 402, 404, and 406 are illustrated). However, instead of including filenames and storage locations of the still frame images, data stream 500 includes image segments (only image segments 520, 522 and 524 are illustrated) which contain markers (only markers 520, 522 and 524 are shown) which identify the particular still frame images. As illustrated in FIG. 5, the markers represent identification numbers $ID_N$ assigned to the corresponding still frame images. In the alternative, the markers can represent simply that the next of a chronological ordering of still frame images is to be retrieved. As before, the digital representations of each still frame image are stored in one or more files which are separate from data stream 500.

Table 510 generated by synchronizer 120 correlates the identification numbers referenced by the markers in data stream 500 to image data corresponding to the still frame images. In some embodiments, the image data correlated to the marker identification numbers includes the filenames and memory storage locations of the corresponding still frame images. One advantage of including markers in the data stream instead of the filenames and storage locations of the still frame images is that the amount of data needed to represent the markers can be less than the amount of data needed to represent the filenames and memory locations of the still frame images. Another advantage is that the presentation can be more easily edited by altering table 510 in order to insert, delete or change the presentation order of the still frame images.

Figure 6:
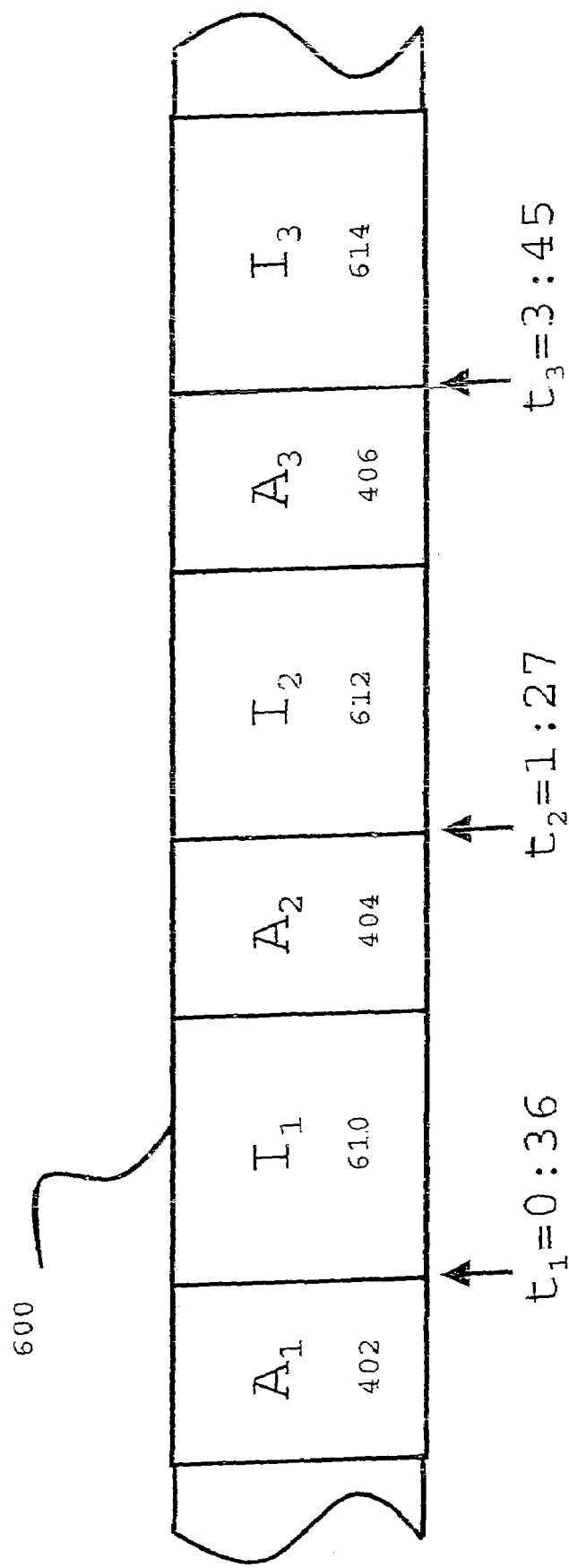
Figure 7:
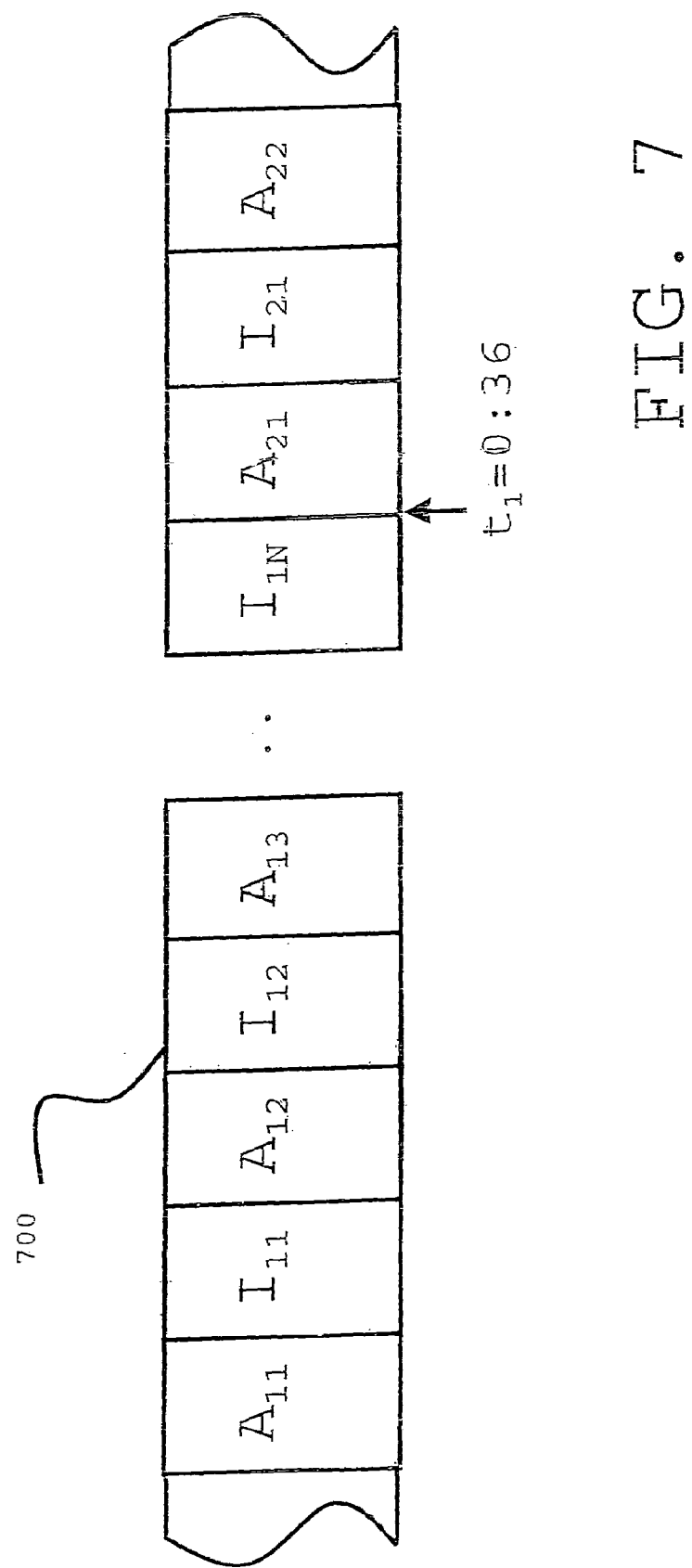

FIGS. 6 and 7 are diagrammatic illustrations of a third format which can be used to store the synchronized audio and still frame image presentation. FIG. 6 illustrates data stream 600 which can be provided by synchronizer 120, stored in memory 140 of recording device 100, and stored in memory and executed along with an application program in playback device 150. Like data streams 400 and. 500, data stream 600 includes the audio data stream divided into segments (only segments 402, 404, and 406 are illustrated). The data in audio segments 402, 404 and 406 is once again designated $A_1$, $A_2$ and $A_3$ in FIG. 6. Instead of including markers or filenames and storage locations of the still frame images, data stream 500 includes image segments (only image segments 610, 612 and 614 are illustrated) which contain the entire digital representations of the particular corresponding still frame images. The image data in image segments 610, 612 and 614 is designated $I_1$, $I_2$ and $I_3$ in FIG. 6.

In the embodiment illustrated in FIG. 6, playback device 150 would likely be required to provide significant buffering of data stream 600 so that the synchronized still frame images can be displayed at the appropriate times, and so that interruptions in the audio portion of the presentation do not occur. Another related embodiment is illustrated in FIG. 7.

Data steam 700 illustrated in FIG. 7 is similar to data stream 600. However, in data stream 700, each of the audio segments and image segments are divided into sub-segments. For example, the audio data $A_1$ in audio segment 402 (FIG. 6) is divided into audio data sub-segments $A_{11}$ through $A_{1N}$. The image data in image segment $I_1$ is divided into image data sub-segments $I_{11}$ through $I_{1N}$. Then, the image data sub-segments are interleaved with, or dispersed within, the audio data sub-segments. Using this method, any delays associated with retrieving the image data for a particular still frame image at the synchronized portion of the audio track will be reduced.

Figure 8:
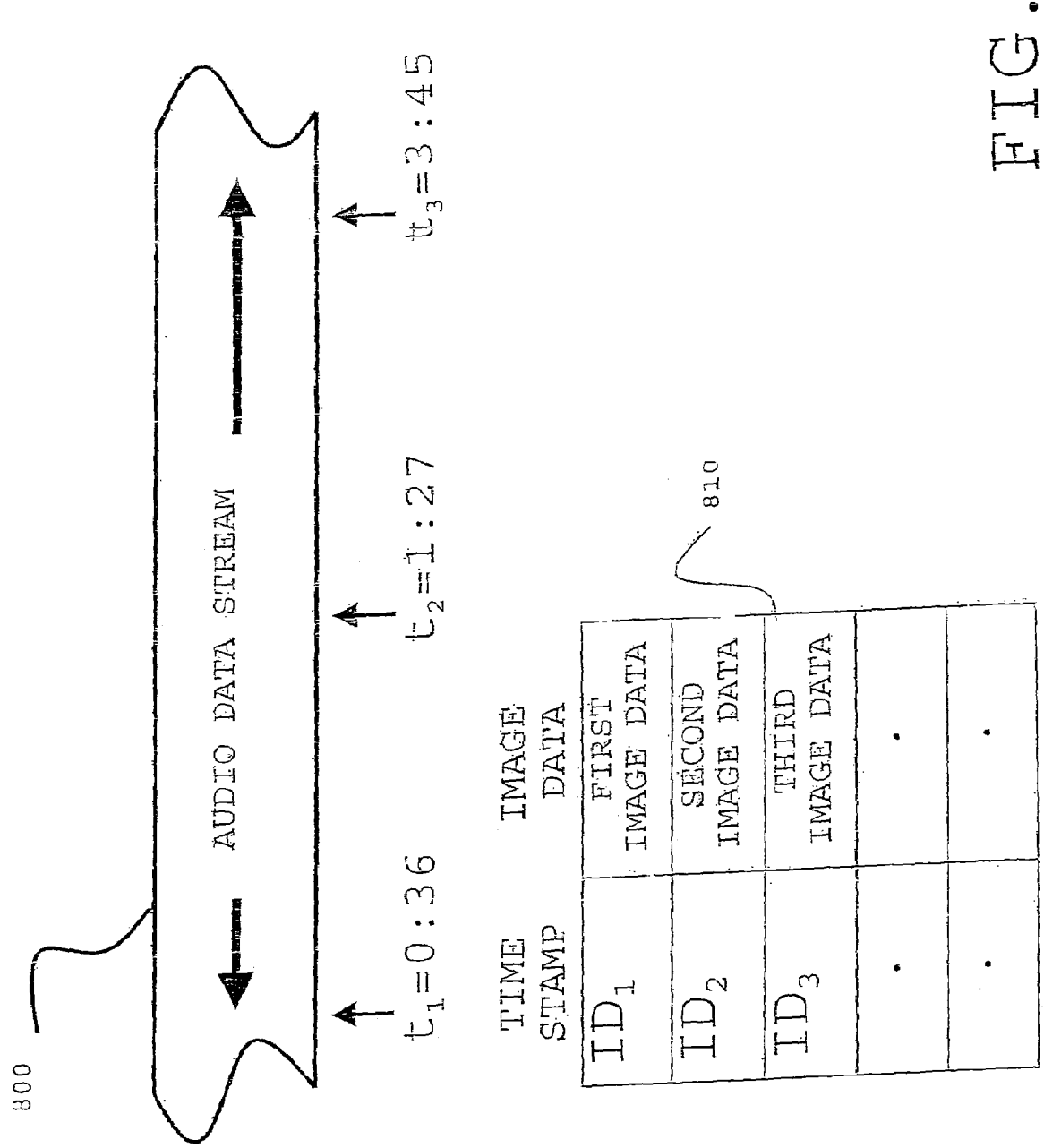

FIG. 8 is a diagrammatic illustration of yet another format which can be used to store the synchronized audio and still frame image presentation. FIG. 8 illustrates data stream 800 and table 810 which can be provided by synchronizer 120, stored in memory 140 of recording device 100, and stored in memory and executed alone with an application program in playback device 150. In this embodiment, data stream 800 includes only the audio data stream. Table 810 correlates a synchronized time stamp to image data for each of the still frame images which are stored in separate files. The image data in table 810 can include the filename and storage location of the still frame images associated with each time stamp.

During playback by playback device 150, the playback application both retrieves the audio data from data stream 800, and monitors table 810. At the synchronized times represented in table 810, the application program retrieves the image data for the corresponding particular still frame image and displays the still frame image using the display device. The format embodiment illustrated in FIG. 8 provides the advantages of minimizing audio interruptions during retrieval of audio data from data stream 800, and the ability to edit the presentation by altering the time stamp or image data stored in table 810.

Figure 9:
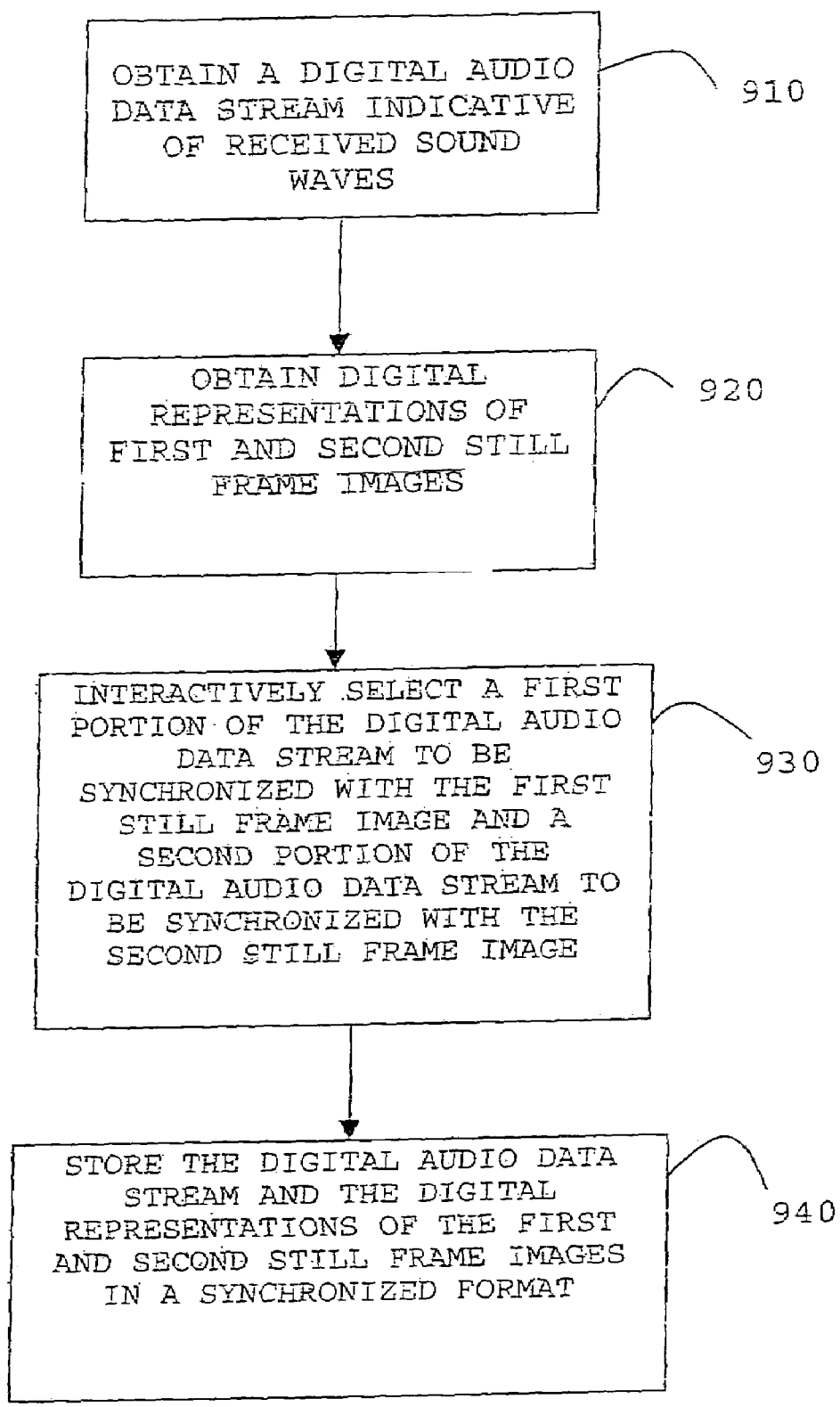
FIG. 9 is a block diagrams illustrating methods of recording audio and synchronized still frame images in accordance with the present invention.

The methods discussed above of recording still frame images with an audio track in a synchronized format are summarized below with reference to FIG. 9. As illustrated at block 910 of FIG. 9, in the methods, a digital audio data stream indicative or received sound waves is obtained. At block 920, digital representations of first and second still frame images are obtained. While the methods illustrated in the FIGS. and described herein include obtaining first and second still frame images, it must be understood that this is exemplary and that any desired number of images can be synchronized. At block 930, first and second portions of the digital audio data stream are interactively selected for synchronization with the first and second still frame images. Alternatively stated, first and second still frame images are interactively selected for synchronization with first and second portions of the digital audio data stream. At block 940, the digital audio data stream and the digital representations of the first and second still frame images are stored in a synchronized format.

As discussed above, in some embodiments, obtaining digital representations of the first and second still frame images (shown at block 920) further includes actuating a shutter button a first time during the first portion of the digital audio data stream, and actuating the shutter button a second time during the second portion of the digital audio data stream.

In some embodiments, storing the digital audio data stream and the digital representations of the first and second still frame images in a synchronized format (shown at block 940) further includes storing the digital representations of the first and second still frame images separately from the digital audio data stream. As discussed above; this storage format can include storing the digital audio data stream with file names and storage locations of the digital representations of the first and second still frame images embedded in the audio data stream. However, in other embodiments, this storage format can include storing the digital audio data stream with embedded markers. The embedded markers synchronize the digital representations of the first and second still frame images to the corresponding first and second portions of the audio data stream. The file names and storage locations of the first and second still frame images can be stored in a table, and the markers can reference particular table positions in order to synchronize the digital representations of the first and second still frame images to the corresponding particular first and second portions of the audio data stream.

In still other embodiments, storing the audio data stream and the still frame images in a synchronized format further includes generating and storing a table which correlates the digital representations of each of the first and second still frame images to first and second time stamps, respectively. The first and second time stamps correspond to the first and second portions, respectively, of the audio data stream.

In yet other embodiments, storing the audio data stream and the first and second still frame images in a synchronized format further includes storing the digital representations of the first and second still frame images embedded within the digital audio data stream.

Although the present invention has been described with reference to preferred embodiments, workers skilled in the art will recognize that changes may be made in form and detail without departing from the spirit and scope of the invention.

What is claimed is:

1. A method of recording still frame images with audio, the method comprising:

obtaining a digital audio data stream indicative of received sound waves;

obtaining a digital representation of a first still frame image;

interactively selecting a first portion of the digital audio data stream to be synchronized with the first still frame image;

obtaining a digital representation of a second still frame image;

interactively selecting a second portion of the digital audio data stream to be synchronized with the second still frame image; and storing the digital audio data stream with file names and storage locations of the digital representations of the first and second still frame images embedded therein.

2. A method of recording still frame images with audio, the method comprising:

obtaining a digital audio data stream indicative of received sound waves;

obtaining a digital representation of a first still frame image;

interactively selecting a first portion of the digital audio data stream to be synchronized with the first still frame image;

obtaining a digital representation of a second still frame image;

interactively selecting a second portion of the digital audio data stream to be synchronized with the second still frame image; and storing the digital audio data stream with markers embedded therein, wherein the markers synchronize the digital representations of the first and second still frame images to the corresponding first and second portions of the audio data stream.

3. The method of claim 2, and further including storing the file names and storage locations of the first and second still frame images in a table, wherein the markers reference particular table positions in order to synchronize the digital representations of the first and second still frame images to the corresponding particular first and second portions of the audio data stream.

4. A method of recording still frame images with audio, the method comprising:

obtaining a digital audio data stream indicative of received sound waves;

obtaining a digital representation of a first still frame image;

interactively selecting a first portion of the digital audio data stream to be synchronized with the first still frame image;

obtaining a digital representation of a second still frame image;

interactively selecting a second portion of the digital audio data stream to be synchronized with the second still frame image; and storing the digital representations of the first and second still frame images embedded within the digital audio data stream.

* * * * *